United States Patent
Dreher

(10) Patent No.: US 10,541,426 B2
(45) Date of Patent: Jan. 21, 2020

(54) METHOD OF MANUFACTURING A METAL-AIR CELL

(71) Applicant: Energizer Brands, LLC, St. Louis, MO (US)

(72) Inventor: Diana Dreher, Troy, NY (US)

(73) Assignee: ENERGIZER BRANDS, LLC, St. Louis, MO (US)

(*) Notice: Subject to any disclaimer, the term of this patent is extended or adjusted under 35 U.S.C. 154(b) by 193 days.

(21) Appl. No.: 15/509,118

(22) PCT Filed: Sep. 22, 2015

(86) PCT No.: PCT/US2015/051477
§ 371 (c)(1),
(2) Date: Mar. 6, 2017

(87) PCT Pub. No.: WO2016/049040
PCT Pub. Date: Mar. 31, 2016

(65) Prior Publication Data
US 2017/0279126 A1    Sep. 28, 2017

Related U.S. Application Data

(60) Provisional application No. 62/053,273, filed on Sep. 22, 2014.

(51) Int. Cl.
| | |
|---|---|
| H01M 4/48 | (2010.01) |
| H01M 4/50 | (2010.01) |
| H01M 4/90 | (2006.01) |
| H01M 12/06 | (2006.01) |
| H01M 12/04 | (2006.01) |
| H01M 4/88 | (2006.01) |
| H01M 4/86 | (2006.01) |
| H01M 4/38 | (2006.01) |
| H01M 4/96 | (2006.01) |

(52) U.S. Cl.
CPC ........... *H01M 4/8882* (2013.01); *H01M 4/38* (2013.01); *H01M 4/8652* (2013.01); *H01M 4/8668* (2013.01); *H01M 4/9016* (2013.01); *H01M 4/9083* (2013.01); *H01M 4/96* (2013.01); *H01M 12/06* (2013.01); *H01M 2300/0014* (2013.01)

(58) Field of Classification Search
None
See application file for complete search history.

(56) References Cited

U.S. PATENT DOCUMENTS

| | | | | |
|---|---|---|---|---|
| 4,894,296 | A * | 1/1990 | Borbely | H01M 4/9016 264/122 |
| 2004/0072683 | A1* | 4/2004 | Kodas | B22F 1/025 502/224 |
| 2008/0102360 | A1 | 5/2008 | Stimits et al. | |
| 2014/0255812 | A1 | 9/2014 | Fischel | |

OTHER PUBLICATIONS

International Searching Authority, International Search Report and Written Opinion for International Application No. PCT/US2015/051477, dated Jan. 4, 2016, 6 pages, United States Patent and Trademark Office, U.S.A.

* cited by examiner

*Primary Examiner* — Yoshitoshi Takeuchi
(74) *Attorney, Agent, or Firm* — Foley & Lardner LLP

(57) ABSTRACT

The invention includes a method of making a catalytic electrode for a metal-air cell in which a carbon-catalyst composite is produced by heating a manganese compound in the presence of a particulate carbon material to form manganese oxide catalyst on the surfaces of the particulate carbon, and then adding virgin particulate carbon material to the carbon-catalyst composite to produce a catalytic mixture that is formed into a catalytic layer. A current collector and an air diffusion layer are added to the catalytic layer to produce the catalytic electrode. The catalytic electrode can be combined with a separator and a negative electrode in a cell housing including an air entry port through which air from outside the container can reach the catalytic electrode.

10 Claims, 1 Drawing Sheet

METHOD OF MANUFACTURING A METAL-AIR CELL

CROSS-REFERENCE TO RELATED APPLICATIONS

This application is a National Stage Application, filed under 35 U.S.C. § 371, of International Application No. PCT/US2015/051477, filed Sep. 22, 2015, which claims priority to United States Application No. 62/053,273, filed Sep. 22, 2014; the contents of both of which are hereby incorporated by reference in their entirety.

BACKGROUND

This invention relates to a metal-air cell, particularly a metal-air cell with a catalytic electrode having a catalytic mixture including a carbon-catalyst composite material, a method of manufacturing the catalytic electrode, and a method of manufacturing the cell.

Metal-air cells have a negative electrode that includes a metal that is oxidized upon discharge of the cell and a positive electrode that reduces oxygen entering from outside the cell. The positive electrode is a catalytic electrode that can include a catalyst for the oxygen reduction reaction and an electrically conductive material such as carbon. In some cells the catalytic electrode includes a carbon-catalyst composite material. Manganese oxides are often used as the catalyst in the carbon-catalyst composite. It serves to catalyze the reduction of peroxides formed from the reduction of oxygen, while the carbon provides both reaction sites for the reduction of oxygen and an electrically conductive matrix in the electrode.

There is an ongoing need to increase the discharge capability of metal-air cells to meet the ever-increasing levels of current and power for electrical devices powered by these battery types, as well as to reduce the cell to cell variation in electrical performance. It is desirable to provide improvements in cell electrical performance with minimal increase in the cell manufacturing processes and costs.

BRIEF SUMMARY

In view of the above, an object of the present invention is to provide a metal-air cell with improved electrical performance, particularly in higher rate and higher power discharge applications. A further object of the invention is to provide a metal-air cell with minimal cell-to-cell variation in electrical performance. Yet another object of the invention is to provide electrode and cell manufacturing processes which can be readily adapted to existing processes with little increase in complexity.

These objects are met and the disadvantages of the prior art are overcome by producing a carbon-catalyst composite and mixing it with particulate carbon to form a mixture in which highly electrically conductive carbon particles with high surface area for reaction sites are admixed with particles of the carbon-catalyst composite that are less electrically conductive. The catalytic mixture is formed into a catalytic electrode used as the positive electrode in a metal-air cell.

Accordingly, a first aspect of the present invention is a method of manufacturing a catalytic electrode for a metal-air cell, the method including the steps:
(a) providing a first particulate carbon material consisting essentially of carbon;
(b) providing a second particulate carbon material consisting essentially of carbon;
(c) providing a manganese compound;
(d) producing a carbon-catalyst composite by heating the manganese compound and the first particulate carbon material to a thermal decomposition temperature of the manganese compound, at which the manganese compound thermally decomposes to form particles of manganese oxide on surfaces of particles of the first particulate carbon material;
(e) producing a catalytic electrode mixture by combining the carbon-catalyst composite with a second particulate carbon material; and
(f) forming a catalytic electrode comprising a layer of the catalytic electrode mixture, an electrically conductive current collector and an air diffusion layer, the air diffusion layer being secured to a surface of the layer of the catalytic mixture.

Embodiments of the method of manufacturing a catalytic electrode for a metal-air cell include any one of the following, or a combination thereof:
  each of the first and second particulate carbon materials is selected from activated carbon, carbon black, acetylene black, graphite, and meso-phase carbon; the particulate carbon can include activated carbon; the particulate carbon can consist essentially of activated carbon;
  the first and second particulate carbon materials have the same composition;
  the first and second particulate carbon materials have different compositions;
  the manganese compound comprises a compound; the manganese compound can be one or more manganese compounds; the one or more manganese compounds can be selected from manganese (II) nitrate and potassium permanganate; the manganese compound can consist essentially of manganese (II) nitrate;
  the manganese compound is provided in a solution with a solvent, and the solution is mixed with the first particulate carbon material; the solvent can be removed prior to the step of heating the manganese compound to the thermal decomposition temperature; the solvent can be removed during the step of heating the manganese compound to the thermal decomposition temperature;
  the manganese oxide includes one or more manganese oxide compounds and has an overall formula $MnO_x(M)$, wherein x is from 0.5 to 2.0, M is one or more metal element dopants; x can be from 0.7 to 2.0; x can be from 1.5 to 1.9; x can be from 1.7 to 1.8; M can be one or more metal elements selected from the group consisting of Au, Cu, Co, Ir, Ni, Pt, Ru;
  the catalytic mixture further includes a binder; the binder can include a fluoropolymer; the binder can include one or more polymers selected from polytetrafluoroethylene, polyvinylidenefluoride, copolymers of hexafluoropropylene, fluorinated ethylene propylene, ultra high molecular weight polyethylene, ultra high molecular weight polypropylene, copolymers of ultra-high molecular weight polyethylene, and copolymers of polypropylene; the binder can be added while combining the carbon-catalyst composite and the second particulate carbon material; the binder can be after the carbon-catalyst composite and the second particulate carbon material are combined; and A second aspect of the invention is a method of manufacturing a metal-air cell, the method including the steps:
(a) providing a first particulate carbon material consisting essentially of carbon;

(b) providing a second particulate carbon material consisting essentially of carbon;
(c) providing a manganese compound;
(d) producing a carbon-catalyst composite by heating the manganese compound and the first particulate carbon material to a thermal decomposition temperature of the manganese compound, at which the manganese compound thermally decomposes to form particles of manganese oxide on surfaces of particles of the first particulate carbon material;
(e) producing a catalytic electrode mixture by combining the carbon-catalyst composite with a second particulate carbon material;
(f) forming a catalytic electrode comprising a layer of the catalytic electrode mixture, an electrically conductive current collector and an air diffusion layer, the air diffusion layer being secured to a surface of the layer of the catalytic mixture; and
(g) assembling the catalytic electrode, a negative electrode and a separator disposed between the catalytic and negative electrodes into a cell housing, the housing comprising a positive electrode container, a negative electrode container and a sealing member sealingly disposed between the positive and negative electrode containers, to form the metal-air cell.

Embodiments of the invention according to the first aspect can include one or a combination of the following:

each of the first and second particulate carbon materials is selected from activated carbon, carbon black, acetylene black, graphite, and meso-phase carbon; the particulate carbon can include activated carbon; the particulate carbon can consist essentially of activated carbon;
the first and second particulate carbon materials have the same composition;
the first and second particulate carbon materials have different compositions;
the manganese compound includes one or more manganese compounds; the one or more manganese compounds can be selected from manganese (II) nitrate and potassium permanganate; the manganese compound can consist essentially of manganese (II) nitrate;
the manganese compound is provided in a solution with a solvent, and the solution is mixed with the first particulate carbon material; the solvent can be removed prior to the step of heating the manganese compound to the thermal decomposition temperature; the solvent can be removed during the step of heating the manganese compound to the thermal decomposition temperature;
the manganese oxide includes one or more manganese oxide compounds and has an overall formula $MnO_x$ (M), wherein x is from 0.5 to 2.0, M is one or more metal element dopants; x can be from 0.7 to 2.0; x can be from 1.5 to 1.9; x can be from 1.7 to 1.8; M can be one or more metal elements selected from the group consisting of Au, Cu, Co, Ir, Ni, Pt, Ru;
the catalytic mixture further includes a binder; the binder can comprise a fluoropolymer; the binder can include one or more polymers selected from polytetrafluoroethylene, polyvinylidenefluoride, copolymers of hexafluoropropylene, fluorinated ethylene propylene, ultra high molecular weight polyethylene, ultra high molecular weight polypropylene, copolymers of ultra-high molecular weight polyethylene, and copolymers of polypropylene; the binder can be added during the step of combining the carbon-catalyst composite and the second particulate carbon material; the binder can be added after the carbon-catalyst composite and the second particulate carbon material are combined;
the negative electrode includes at least one metal; the metal can include zinc or an alloy thereof;
the negative electrode includes an electrolyte; the electrolyte can include water; the electrolyte can be an aqueous alkaline electrolyte;
the positive electrode container includes at least one air entry port therethrough to allow oxygen from outside the cell housing to enter the cell and reach the catalytic electrode;
the air diffusion layer is disposed on a surface of the layer of the catalytic mixture that faces an air entry port in the positive electrode container, and the separator is disposed on a surface of the layer of the catalytic mixture that faces the negative electrode;

These and other features, advantages and objects of the present invention will be further understood and appreciated by those skilled in the art by reference to the following specification, claims and appended drawings.

Unless otherwise specified, the following definitions and methods are used herein:
"conductive" means electrically conductive unless otherwise specified;
"consists/consisting essentially of" means containing no more than impurities or contaminants of other materials; and
"virgin carbon" is particulate carbon that has not had manganese oxide formed on the surface thereof by thermal decomposition.

Unless otherwise specified herein, all disclosed characteristics and ranges are as determined at room temperature (20-25° C.).

DETAILED DESCRIPTION OF VARIOUS EMBODIMENTS

One method of forming the catalyst is to heat a mixture including particulate carbon and a manganese compound, converting the manganese compound to a manganese oxide by thermal decomposition, with the manganese oxide being deposited on the surfaces of the carbon particles.

It has been discovered that too much of the surface area of the carbon particles may be covered by the catalyst. The uniformity of coverage of the surfaces of the carbon particles can also vary, leading to batch to batch and/or cell to cell variation in electrical performance. It is also believed that, because manganese oxide is more hydrophilic than activated carbon, coverage of more of the carbon surface may contribute to flooding of the catalytic electrode by the aqueous electrolyte.

By separating the process for making the catalytic mixture into several steps, a catalytic mixture with at least a minimum surface area of exposed carbon is assured. Rather than thermally converting the manganese compound to manganese oxide in the presence of all of the carbon, the carbon-catalyst composite is made using only a portion of the total amount of carbon that will be used in the catalytic mixture.

Additional "virgin" carbon (with no catalyst deposited on the surfaces of the particles) is blended with the carbon-catalyst composite.

Figure 1:
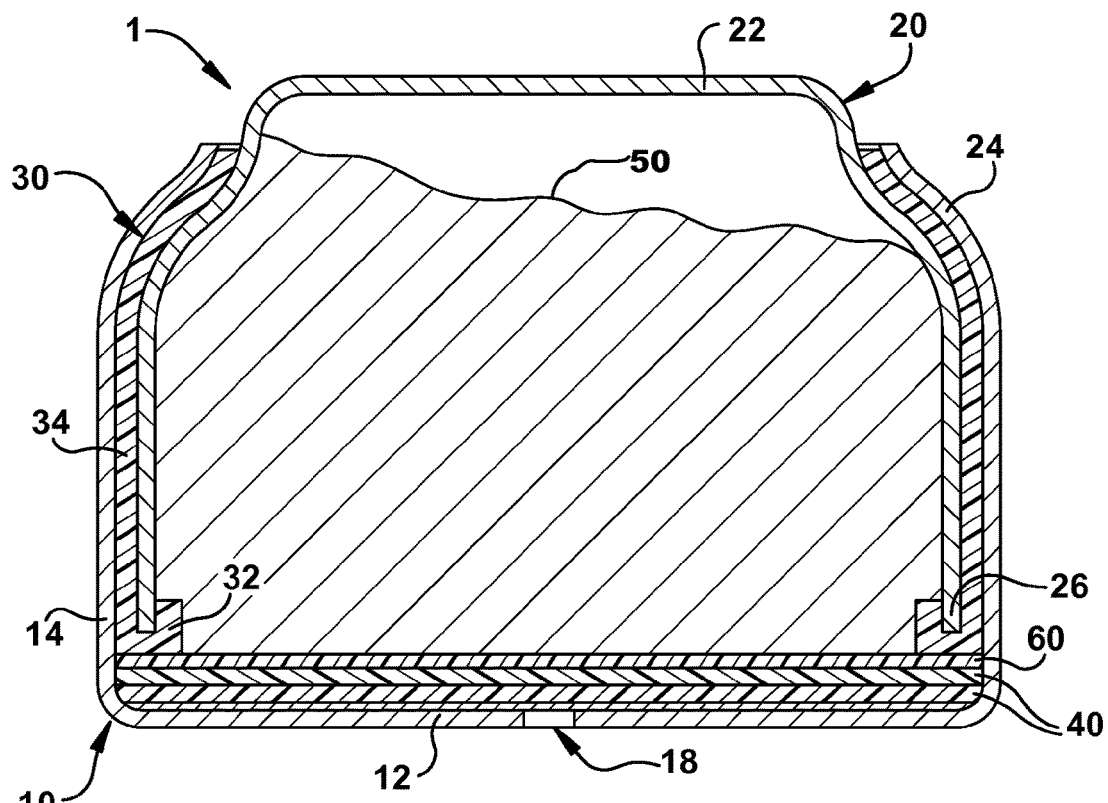
FIG. 1 is a full sectional elevational view of an electrochemical battery cell.
Figure 2:
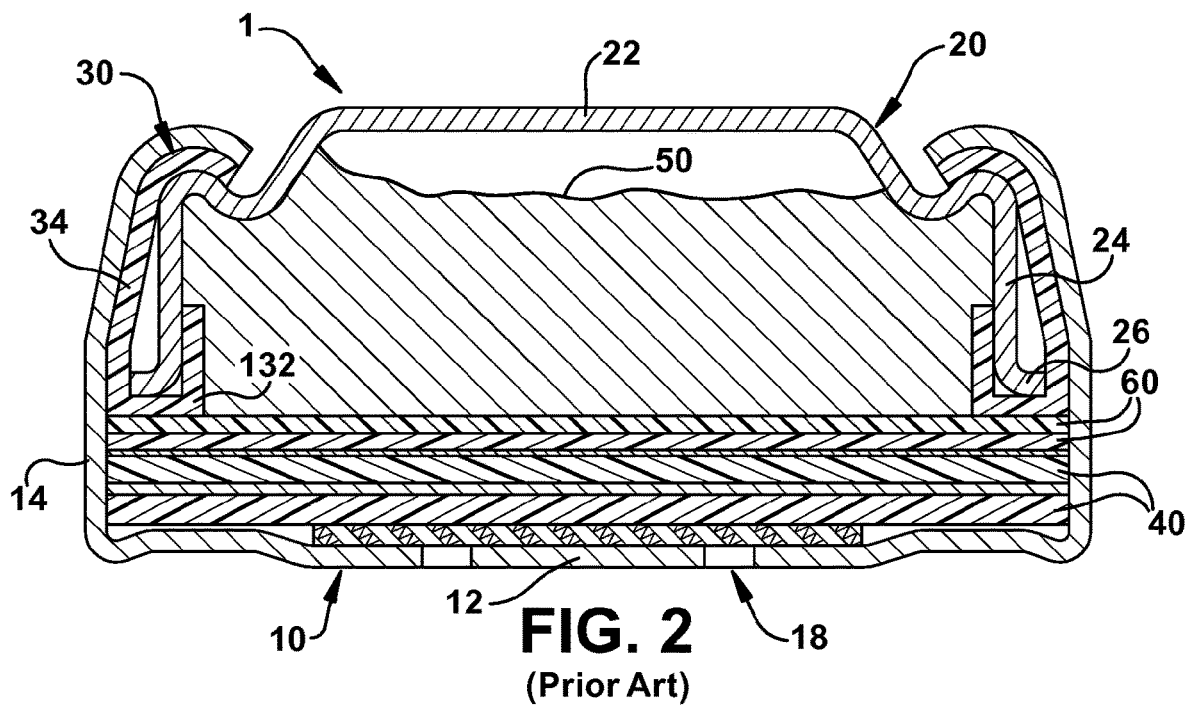
FIG. 2 is a full sectional elevational view of an alternative embodiment of an electrochemical battery cell.

Metal-air cells are well known in the art. An example of a metal-air cell is shown in FIG. 1. The cell 1 has a housing including a can 10, a cup 20 and a gasket 30, each of which has a wall 14, 24, 34 extending from a base 12, 22, 32. The can wall 14 is on the outside of the cell 1, and the cup wall 24 is on the inside of the cell 1. The gasket wall 34 is disposed between the can and cup walls 14, 24. The inner and outer surfaces of the gasket wall 34 are in contact with adjacent surfaces of the can and cup walls 14, 24 to close the cell housing and provide a compression seal. Contained within the housing are a positive electrode 40, a negative electrode 50, a separator 60 between the electrodes 40, 50, and an electrolyte (not shown). The positive electrode 40 is in physical and electrical contact with the can 10, and the negative electrode 50 is in physical contact with the cup 20. The gasket base 32 is disposed between the cup wall 24 and the positive electrode 40. The can wall 14 applies a radial force against the adjacent gasket and cup walls 34, 24, creating compressive seals between the gasket wall 34 and the can and cup walls 14, 24. The can wall 14 also applies an axial force against the gasket and cup walls 34, 24, creating a seal between the gasket base 32 and the adjacent portion of the cup wall 24, as well as a seal between the gasket base 32 and the peripheral portion of the positive electrode 40. Air from outside the cell can enter through one or more air entry ports 18. Other embodiments of metal-air cells are also possible, as well known in the art. For example, FIG. 2 shows an alternative in which reference numerals are identical to those described in FIG. 1, excepting that gasket 132 in FIG. 2 has a slightly different shape than its corresponding component in FIG. 1.

Metal-air cells have a metal as the active material of the negative electrode. Examples of suitable metals include zinc, aluminum, magnesium and lithium and alloys thereof. Zinc or a zinc alloy is preferred. The negative electrode also includes a portion of the cell electrolyte, and it may also include a gelling agent or binder. Various additives can also be used, e.g., to reduce corrosion of the metal or to reduce gas generation within the negative electrode and/or improve cell discharge performance. The electrolyte typically is or includes an aqueous alkaline electrolyte, such as potassium hydroxide, sodium hydroxide or a combination thereof.

The positive (catalytic) electrode includes particulate carbon and a catalyst that can reduce oxygen in the air entering the cell. The catalytic electrode can include a binder to bind the particulate material together, and may contain various optional additives (e.g., to improve cell discharge performance). In the assembled cell, a limited portion of the cell electrolyte will be distributed in the electrode. The catalytic electrode often includes a current collector and may have a layered configuration, such as a catalytic layer containing the carbon and catalyst, a current collector on the surface of and/or embedded into the catalytic layer, and a gas diffusion layer on the surface of the catalytic electrode facing the air entry port(s) or otherwise in fluid communication with air that has entered the cell.

In a metal-air cell, oxygen in the air is reduced within the positive electrode to produce electrons and hydroxyl ions. Electrons and hydroxyl ions originating in the positive electrode react in the negative electrode to oxidize the metal. The oxygen reduction reaction (ORR) in the positive electrode requires physical contact among the oxygen, an ORR catalyst and the electrolyte. Manganese oxides are often used as ORR catalysts because they are relatively inexpensive and easy to manufacture. A manganese compound can be converted to a desired manganese oxide by thermal decomposition in the presence of carbon particles. This conveniently results in the manganese catalyst compound being uniformly deposited onto the surfaces of the larger carbon particles. It has been discovered that variation in the amount of manganese oxide on the surface of the carbon can result in variation in catalytic (positive) electrical performance, particularly on high current and high power (referred to below as high rate for convenience) discharge. It has also been discovered that increasing the amount of manganese oxide catalyst relative to the amount of carbon can result in lower rather than improved high rate performance as one might expect.

It is believed that the observed decrease in catalytic electrode electrical performance with high levels of catalyst loading of the carbon particles is explained by one or both of three likely causes: (1) blocking carbon surfaces that serve as the reaction site for the ORR and provide an electrically conductive matrix within the catalytic mixture, (2) making the composite carbon-catalyst particles more hydrophilic, contributing to catalytic electrode flooding and preventing oxygen from diffusing into and within the catalytic electrode, and (3) changes in the surface chemistry of the carbon surface during thermal decomposition of the manganese compound (e.g., manganese nitrate).

Consequently, when a carbon-catalyst composite material including manganese oxide formed on the surfaces of carbon particles by thermal decomposition, it is desirable to control the amount and distribution of carbon and catalyst within the electrode. This is accomplished by mixing particles of virgin carbon (carbon consisting of particles that do not have manganese oxide formed thereon by thermal decomposition of a manganese compound) with the composite carbon-catalyst particles formed by thermal decomposition of a manganese compound in the presence of carbon particles. The resultant catalytic electrode mixture is then formed into a catalytic layer, a current collector is combined with the catalytic layer, and an air diffusion layer is secured to a surface of the catalytic layer to form the catalytic electrode.

The carbon-catalyst composite is made by heating a manganese compound and particulate carbon to the thermal decomposition temperature of the manganese compound to form particles of a manganese oxide on the surfaces of the particulate carbon. In some embodiments the manganese compound is dissolved in a solvent, the solution is mixed with the particulate carbon, and the mixture is heated. The solvent can be removed as a separate step prior to heating to the thermal decomposition temperature of the manganese compound, or the solvent can be removed during the heating.

Virgin particulate carbon, which can be either the same type of carbon in the carbon-catalyst composite or a different type of carbon, is mixed with the composite to form the catalytic mixture.

The particulate carbon can be any suitable particulate carbon known in the art, including but not limited activated carbon and carbon black, preferably an activated carbon. It is desirable for the carbon itself to function as a catalyst for the ORR. An activated carbon is a carbon with a specific surface area (BET method using nitrogen) of at least about 500 $m^2$/g, with 1800 $m^2$ being achievable.

A single type or a combination of two or more types of particulate carbon can be used to make the carbon-catalyst composite and as the virgin carbon. As used herein "type" refers to a single set of properties, such as BET surface area, pore size, pore volume distribution, and surface area distribution data. The composition of the carbon used in the composite can be the same as or different from the composition of the virgin carbon.

The manganese compound is a compound that will decompose upon heating the solution to produce the desired manganese oxide(s). Preferably the manganese compound is soluble in a solvent, and the manganese compound is mixed with the particulate carbon while in solution. Examples of suitable manganese compounds include potassium permanganate and $Mn(NO_3)_2$. Aqueous solvents, particularly water, are preferred.

The manganese oxide is one or a combination of manganese oxide compounds with the overall general formula $MnO_x(M)$ where M is a metal dopant such as Au, Cu, Co, Ir, Ni, Pt, Ru and combinations thereof, and x is from about 0.5 to about 2, preferably from about 0.7 to about 2.0, more preferably from about 1.5 to about 1.9, and most preferably from about 1.7 to about 1.8. For example, when the average oxidation state of Mn is 3.4, x equals 1.7, and when the manganese oxide consists of equal moles of $MnO_2$ and $Mn_2O_3$, x equals 1.75. When a metal dopant is included, it is preferably present at about 5 to 40 parts per million.

Generally a binder is included in the catalytic mixture. The binder can be added before, during or after mixing the composite and virgin carbon, in any suitable form (e.g., a dry solid or a dispersion). Desired additives can be similarly added. Any suitable binder can be used. Examples include but are not limited to a fluorocarbon material, such as polytetrafluoroethylene (PTFE). Examples of additives include pore formers and lubricants (i.e., aids to forming a catalytic layer).

The sequence of adding the components of the catalytic mixture can depend on the physical states of the components and the mixing process(es) selected. Any suitable mixing process can be used, such as wet or dry blending or milling. It can be possible to modify an existing mixing process or processes to incorporate the virgin carbon at an advantageous point.

Undesired reaction products from the thermal decomposition of the manganese compound can be removed by washing with a solvent and drying.

The catalytic mixture is then formed into a catalytic layer. As used herein, "layer" can be a generally planar, or it can be of another shape, depending on the design of the metal-air cell. Any suitable process known in the art can be used, such as rolling with a nip roller, extruding and compression molding.

A current collector can be combined with the catalytic layer using any suitable process. For example, the catalytic layer can be formed around the current collector, or the current collector can be partially or fully embedded into the catalytic layer. The current collector can be disposed in the center of or in either side of the catalytic layer. In one embodiment it is disposed on the side of the catalytic layer that faces the separator, and in another embodiment it is disposed on the side of the catalytic layer to which the air diffusion layer is secured.

The air diffusion layer can be secured to a surface of the catalytic layer by any suitable process, such as by pressure lamination and/or with an adhesive. The air diffusion layer can be an oxygen-permeable polymeric film, such as PTFE film. In the assembled cell, the side of the catalytic electrode to which the air diffusion layer is secured faces one or more air entry ports in the cell container or is otherwise in fluid communication with air from outside the cell (i.e., it is secured to the side opposite the separator and negative electrode).

The cell can be assembled using any conventional cell assembly process.

It was observed that increasing the $MnO_x$ content of the carbon-catalyst composite used to make catalytic positive electrodes for zinc-air cells resulted in reduced high rate discharge performance. The following examples illustrate the invention and its advantages.

EXAMPLE 1

Comparative catalytic electrodes were made using a particulate activated carbon (Calgon PWA carbon), an aqueous manganese nitrate solution (50% reagent grade $Mn(NO_3)_2$), polytetrafluoroethylene (PTFE) dispersion (DuPont TE3858) and distilled water, according to the following steps:

(a) Load dry carbon into a blender;

(b) While blending, add distilled water, then manganese nitrate solution;

(c) Dry the mixture under argon at 125° C. for 4 hours;

(d) Heat the mixture at 225° C. for 3 hours to thermally decompose the $Mn(NO_3)_2$ and form a carbon-$MnO_x$ catalyst composite;

(e) Cool the carbon-catalyst composite;

(f) Load the carbon-catalyst composite into a blender;

(g) Mix PTFE dispersion and distilled water and add to the carbon-catalyst composite while blending to produce a catalytic mixture;

(h) Dry the catalytic mixture under a vacuum at a temperature no greater than 240° F. while blending;

(i) Granulate the catalytic mixture;

(j) Form the granulated catalytic mixture into a sheet using a two-roll mill;

(k) Embed current collector into the catalytic sheet;

(l) Laminate a sheet of PTFE membrane onto the embedded catalytic sheet using a nip mill pressure laminator;

(m) Bond or laminate a separator layer on the opposite side of the electrode from the PTFE membrane; and (n) Cut the laminated catalytic electrode to size.

Catalytic electrodes according to the invention were made in the same manner except that virgin Calgon PWA carbon was blended with the cooled carbon-catalyst composite before adding the PTFE dispersion.

Carbon-catalyst composites were made with three levels of $MnO_x$/carbon. The formulations are shown in Table 1.

TABLE 1

| Composite Lot | Lot A | Lot B | Lot C |
|---|---|---|---|
| $MnO_x$/carbon level | standard (6.3 wt %) | high (10 wt %) | low (2.9 wt %) |
| Carbon | 5250 g | 3923 g | 5215 g |
| Manganese nitrate | 1445.5 g | 1807 g | 651 g |
| Deionized water | 2600 g | 1623 g | 2582 g |
| Rinse water (deionized) | 300 g | 300 g | 300 g |

Using lots of carbon-catalyst composite from Example 1, four catalytic mixtures were made, two with and two without virgin carbon added. The formulations are shown in Table 2, as well as the final $MnO_x$/carbon (target and actual) in the catalytic mixture.

TABLE 2

| Catalytic Mixture Lot | 1 | 2 | 3 | 4 |
|---|---|---|---|---|
| Composite Lot | A | C | A | B |
| Target $MnO_x$/carbon | 5% | 2.5% | 2.5% | 5% |
| Actual $MnO_x$/carbon | 5.33% | 2.47% | 2.68% | 4.25% |
| Composite (g) | 4660 | 4427 | 2313.5 | 2213.5 |
| Virgin carbon (g) | 0 | 0 | 2213.5 | 2213.5 |
| PTFE dispersion (g) | 1370.6 | 1299 | 1299 | 1299 |
| Deionized water (g) | 2871.4 | 2600 | 2600 | 2600 |
| Rinse water (deionized) (g) | 300 | 300 | 300 | 300 |

EXAMPLE 2

Catalytic electrodes and PR48 type zinc-air cells were made with catalytic electrodes from each of the Lots of catalytic mixture from Example 2. Electrodes from each lot were tested on a Limiting Current test, and cells from each lot were tested on three other tests, as described below:

Limiting current test. A catalytic electrode is placed in a test fixture containing 33 weight percent KOH electrolyte, with the PTFE layer exposed to the external air and the opposite side of the electrode exposed to the electrolyte. A potentiodynamic scan is performed using a potentionstat with Pt and Zn wires as the counter electrode and reference electrode, respectively, running the scan from open circuit voltage to 1.05 V (vs. Zn) at 1 mV/sec. The current in mA at 1.05 V divided by the electrode area in $cm^2$ is defined as the limiting current.

IEC HD tests. A cell is placed on a 3 mA background load, and a 12 mA load is applied for 0.1 seconds every 2 hours for 12 hours per day until the cell reaches 1.05 V or less. The cell discharge capacity in mAh to both 1.1 V and 1.05 V are calculated.

Wireless test. A cell is placed on a 3 mA background load, and a 5 mA load is applied for 15 minutes every 45 minutes for 12 hours per day until the cell reaches 1.10 V or less. The cell discharge capacity in mAh to 1.10 V is calculated.

The test results are shown in Table 3. This testing shows improvement in high rate performance with the invention, particularly at a 2.5% $MnO_x$/carbon level.

TABLE 3

| Lot | 1 | 2 | 3 | 4 |
|---|---|---|---|---|
| Composite Lot | A | C | A | B |
| Target $MnO_x$/carbon | 5% | 2.5% | 2.5% | 5% |
| Virgin carbon | no | no | yes | yes |
| Limiting current ($mA/cm^2$) - average | 69.7 | 72.2 | 79.9 | 114.8 |
| IEC HD (mAh to 1.1 V) - average | 188.6 | 177.9 | 206.0 | 175.9 |
| IEC HD (mAh to 1.05 V) - average | 212.4 | 199.7 | 231.9 | 199.4 |
| Wireless (mAh) - average | 154.0 | 146.9 | 180.4 | 155.2 |

It will be appreciated that the advantages provided by the invention will vary based on variables such as the types of particulate carbons and the manganese compound used, processing variables such as the thermal decomposition temperature, and the electrical performance test used.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. A method of manufacturing a catalytic electrode for a metal-air cell, the method comprising the steps:
    (a) providing a first particulate carbon material consisting essentially of carbon;
    (b) providing a manganese compound;
    (c) wet blending the first particulate carbon material and the manganese compound to form a blended intermediate mixture;
    (d) drying the blended intermediate mixture at a first temperature below the thermal decomposition temperature of the manganese compound;
    (e) producing a carbon-catalyst composite by heating the dried blended intermediate mixture to a thermal decomposition temperature of the manganese compound, at which the manganese compound thermally decomposes to form the carbon-catalyst composite comprising particles of manganese oxide on surfaces of particles of the first particulate carbon material;
    (f) cooling the carbon-catalyst composite;
    (g) producing a catalytic electrode mixture by combining the carbon-catalyst composite with a second particulate carbon consisting essentially of carbon;
    (h) granulating, the catalytic electrode mixture; and
    (i) forming a catalytic electrode comprising a layer of the catalytic electrode mixture, an electrically conductive current collector and an air diffusion layer, the air diffusion layer being secured to a surface of the layer of the catalytic mixture.

2. The method according to claim 1, wherein each of the first and second particulate carbon materials is selected from activated carbon, carbon black, acetylene black, graphite, and meso-phase carbon.

3. The method according to claim 2, wherein the first and second particulate carbon materials have the same composition.

4. The method according to claim 1, wherein the manganese compound is at least one selected from: manganese (II) nitrate and potassium permanganate.

5. The method according to claim 4, wherein the manganese compound is provided in a solution with a solvent and the solution is mixed with the first particulate carbon material.

6. The method according to claim 5, wherein the solvent is removed prior to the step of heating the dried blended intermediate mixture to the thermal decomposition temperature.

7. The method according to claim 1, wherein the manganese oxide comprises one or more manganese oxide compounds comprising one or more metal element dopants and has an overall formula $MnO_x(M)$, wherein x is from 0.5 to 2.0, and M is the one or more metal element dopants.

8. The method according to claim 7, wherein M is selected from the group consisting of Au, Cu, Co, Ir, Ni, Pt, Ru.

9. The method according to claim 1, wherein the manganese compound consists essentially of manganese (II) nitrate.

10. The method according to claim 1, wherein the catalytic electrode mixture further comprises at least one binder selected from: a fluoropolymer, polytetrafluoroethylene, polyvinylidenefluoride, copolymers of hexafluoropropylene, fluorinated ethylene propylene, ultra high molecular weight polyethylene, ultra high molecular weight polypropylene, copolymers of ultra-high molecular weight polyethylene and copolymers of polypropylene.

* * * * *